United States Patent
Cerutti et al.

(10) Patent No.: US 6,971,839 B2
(45) Date of Patent: Dec. 6, 2005

(54) MACHINE AND METHOD FOR GROUPING PRODUCTS IN STACKS HAVING A PRE-SET LENGTH

(75) Inventors: Giuliano Cerutti, Borgomanero (IT); Pierre Menegaldo, Borgosesia (IT); Filippo Barberis Organista, Trivero (IT)

(73) Assignee: SPS Italiana Pack Systems SpA, Cressna (IT)

( * ) Notice: Subject to any disclaimer, the term of this patent is extended or adjusted under 35 U.S.C. 154(b) by 25 days.

(21) Appl. No.: 10/274,832

(22) Filed: Oct. 21, 2002

(65) Prior Publication Data

US 2003/0082045 A1    May 1, 2003

(30) Foreign Application Priority Data

Oct. 22, 2001    (EP) .................................. 01830665

(51) Int. Cl.[7] .............................................. B65G 57/00
(52) U.S. Cl. ................... 414/798.7; 414/790.6; 198/418.6; 198/418.7
(58) Field of Search ................ 414/798.2, 798.7, 414/790.6; 198/418.6, 418.7

(56) References Cited

U.S. PATENT DOCUMENTS

| | | | | |
|---|---|---|---|---|
| 1,402,223 A | * | 1/1922 | Fogde et al. ............. | 414/792.7 |
| 4,522,294 A | | 6/1985 | Walz | |
| 4,611,705 A | * | 9/1986 | Fluck ...................... | 414/798.9 |
| 4,708,568 A | * | 11/1987 | Odorici ................... | 414/798.7 |
| 4,772,003 A | * | 9/1988 | Nobuta et al. ........... | 270/52.14 |
| 4,921,398 A | * | 5/1990 | Fluck ...................... | 414/798.7 |
| 4,993,916 A | * | 2/1991 | Dorner .................... | 414/798.7 |
| 5,662,454 A | * | 9/1997 | Baufreton et al. ....... | 414/798.2 |
| 6,161,830 A | * | 12/2000 | Yap ......................... | 414/798.7 |
| 6,182,814 B1 | * | 2/2001 | Koehler ................... | 198/418.7 |
| 6,834,755 B2 | * | 12/2004 | Jay ........................... | 198/418.6 |

FOREIGN PATENT DOCUMENTS

DE    1281938 B    10/1968
FR    1476915 A    4/1967

OTHER PUBLICATIONS

Copy of European Search Report in EP 01830665, SASIB Packaging System S.p.A., dated Mar. 28, 2002.

\* cited by examiner

*Primary Examiner*—Joe Dillon, Jr.
(74) *Attorney, Agent, or Firm*—Gibbons, Del Deo, Dolan, Griffinger & Vecchione

(57) ABSTRACT

A machine and a method for carrying out portioning of products in stacks having a pre-set length. One or more portioning stations are provided, in which there are present at least two elements for supporting the stack, the supporting elements being mobile in translation, parallel to the longitudinal axis of the stack, between an initial position of separation of the stack from the respective row and a final position distant from the initial position at a distance greater than or equal to the pre-set length of the stack.

13 Claims, 6 Drawing Sheets

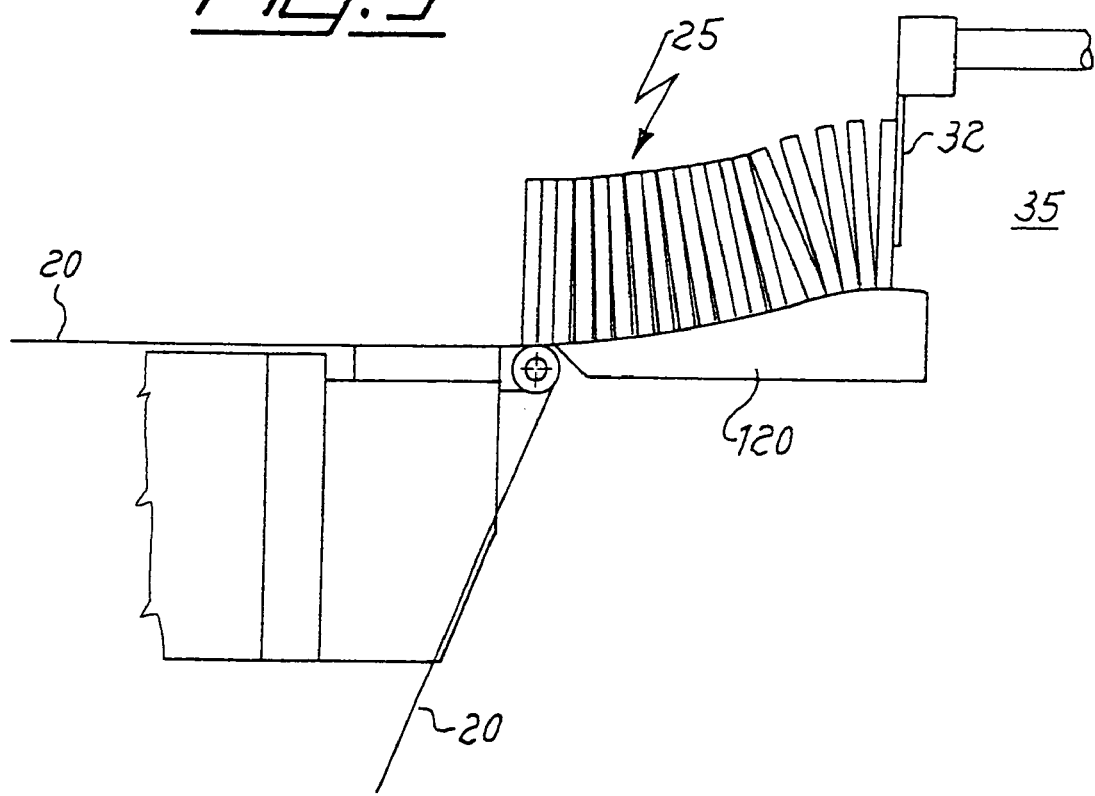

MACHINE AND METHOD FOR GROUPING PRODUCTS IN STACKS HAVING A PRE-SET LENGTH

BACKGROUND OF THE INVENTION

1. Field of the Invention

The present invention relates to a machine for the volumetric portioning of products in stacks, namely a machine which makes it possible to obtain stacks of pre-set length of said products, designed to be subsequently enclosed in a wrapper along a packaging line for packaging said products.

The invention finds, for example, application in plants for packaging foodstuff products, such as biscuits or the like, in which the products coming from a preparation station, for example an oven, are set facing one another in a substantially vertical position and resting with one side edge on a feed conveyor, so as to form one or more continuous rows of products. The products thus arranged, which are defined, on account of their disposition, also as "edgewise" products, are then fed to a portioning unit capable of forming stacks that all have a length, or volume, that is substantially the same.

2. Discussion of Related Art

An example of a known machine for the portioning of biscuits is described in the U.S. Pat. No. 4,522,294. In this known machine, the biscuits are fed in rows from a conveyor that is slightly inclined downwards. Each row bears upon a mobile resting element, which is made to back off up to a pre-set position, into a position corresponding to which there is presumed to be a stack of the desired length.

In front of the tray there are present mobile stop elements which are inserted in the row when the mobile resting element has reached the end of its range, thus carrying out separation between the row of products and the stack of pre-set length. At this point, the feed conveyor is stopped, and the stack present on the tray is released onto an underlying feed conveyor, while the resting element returns to the start of the row for receiving again the row of products that will be made to advance.

The above type of machine presents various drawbacks. In the first place, the times involved in forming a stack are excessively long. In fact, for each stack formed, the resting element must be brought back into position for enabling formation of a new stack. Consequently, this known machine is far from suitable for being used in high-output packaging lines.

Moreover, the separation of the stack from the row of products is practically performed by "forcing" the stop elements between the product at the head of the row and the product at the bottom of the stack. This system may also lead to damaging of the products, and hence to obtaining possible packets of products that are far from attractive from the commercial point of view, but also the debris deriving from the damaging of the products, such as crumbs or cream filling, may interfere with proper operation of the machine in general.

Of importance is that all the synchronised movements of the machine proposed by the cited US patent are prevalently obtained by means of mechanical connections, and are hence intrinsically limited as regards the maximum operating speeds, which moreover call for frequent adjustments on account of the wear of the mechanical-connection elements.

SUMMARY OF THE INVENTION

In general, an aspect of the present invention is to propose a machine and a method which will enable portioning of products in stacks having pre-set length to be carried out in a particularly fast way.

Another aspect of the present invention is to provide a machine and a method which will enable portioning of products to be carried out without damaging the products themselves.

Yet a further aspect of the present invention is to provide a machine that is particularly versatile for carrying out volumetric portioning of products.

The present invention relates to a machine for portioning products in stacks having a pre-set length, of the type comprising a feed conveyor which carries the products to a portioning unit provided with one or more portioning stations, the products being set facing one another in a substantially vertical position and resting with a side edge on the feed conveyor to form one or more continuous rows of products, each of the rows of products being directed to a respective one of the one or more portioning stations, characterised in that each of the portioning stations comprises at least two elements for supporting the mobile stack in translation, parallel to the longitudinal axis of the stack, between an initial position of separation of the stack from the respective row and a final position distant from the initial position by a distance greater than or equal to the pre-set length of the stack. The continuous movement of the at least two supporting elements enables portioning in stacks to be rendered extremely fast.

According to a particular aspect of the invention, each of the two supporting elements for supporting the stack can be operated in a mutually exclusive way for separating the stack from the respective row when it is in the initial position.

In practice, while one of the supporting elements follows, in translation, the formation of a stack, bearing upon the product at the top of the stack, another of the supporting elements returns into the position suitable for carrying out the separation of the stack at the completion of its formation. Subsequently, it will be this latter other element that bears upon the product at the top of the new stack that is to be formed, whilst the other supporting element will return to the envisaged position of separation.

The supporting elements are moreover mobile in rotation between a position of engagement with the products set at the opposite ends of a stack and a position of disengagement with the products set at the end of the stack.

In a preferential embodiment of the machine according to the present invention there are provided at least one first supporting element and at least one second supporting element in each portioning station. The first supporting elements of all the portioning stations are driven in translation by a first electric motor, which is controlled independently with respect to a second electric motor, which drives in translation the second supporting elements of all the portioning stations.

In the same way, a third electric motor and a fourth electric motor, controlled in a mutually independent way, operate in rotation the first supporting elements and the second supporting elements, respectively, of all the portioning stations.

There are moreover provided stop elements for arresting the row in each of the portioning stations. The stop elements are mobile between a position of engagement with the product at the end of the row and a position of disengagement with the product at the end of the row.

Advantageously, the stop elements in any portioning station may be driven in translation independently with respect to the stop elements in any other portioning station. This enables individual control of activation or de-activation of the feed of products to one or more portioning stations, for example in the case in which there may occur an irregular or insufficient presence of products in a row, or anyway in every case in which it is necessary or desirable to prevent the feed of products to one or more portioning stations of the machine.

According to an advantageous aspect of the present invention, the feed conveyor is inclined with respect to the resting surface consisting of the bottom means in each of the portioning stations. In particular, the angle formed between the conveyor and the resting surface formed by the bottom means is greater than 180°.

This enables formation of an open angled space between the products, in a position corresponding to the passage from the feed conveyor to each of the portioning stations. In other words, the products which pass from the feed conveyor to each of the portioning stations are opened "fanwise", so enabling insertion of a supporting element in a space delimited by two successive products, without causing any damage to the products themselves.

There may be advantageously provided means for directing a controlled flow of air under pressure towards the products in a position corresponding to the area of passage of the products from the feed conveyor to each of the portioning stations. This enables facilitation of the fanwise opening of the products at the moment of insertion of the supporting element, which will act as separator of the stack from the row.

Even if the feed conveyor is driven in an intermittent way, as occurs in the case of known machines, it is clear that the time of arrest of the conveyor is limited to the time necessary for separating and discharging a stack that has been formed.

The invention moreover relates to a method for carrying out portioning of products in stacks having a pre-set length, in which a feed conveyor carries the products to a portioning unit provided with one or more portioning stations, the products being set facing one another in a substantially vertical position and resting with a side edge upon the feed conveyor so as to form one or more continuous rows of products, each of the rows of products being directed to a respective one of the one or more portioning stations, characterised in that the stack is formed by means of two supporting elements that are mobile in translation, parallel to the longitudinal axis of the stack, between an initial position of separation of the stack from the respective row and a final position distant from the initial position for a distance greater than or equal to the pre-set length of the stack.

BRIEF DESCRIPTION OF THE DRAWING

Further characteristics and advantages of the present invention will emerge more clearly from the ensuing description, intended purely by way of illustrative and non-limiting example, with reference to the schematic drawings annexed hereto, in which:

FIGS. 3A–8A are schematic front views, taken from the inside of the machine, which illustrate the various steps of formation of a stack in a portioning station;

FIGS. 3B–8B are schematic side views respectively corresponding to those of FIGS. 3A–8A; and FIG. 9 is a cross-sectional side view of a detail of the machine according to a possible embodiment of the invention.

DETAILED DESCRIPTION OF THE INVENTION

Figure 1:
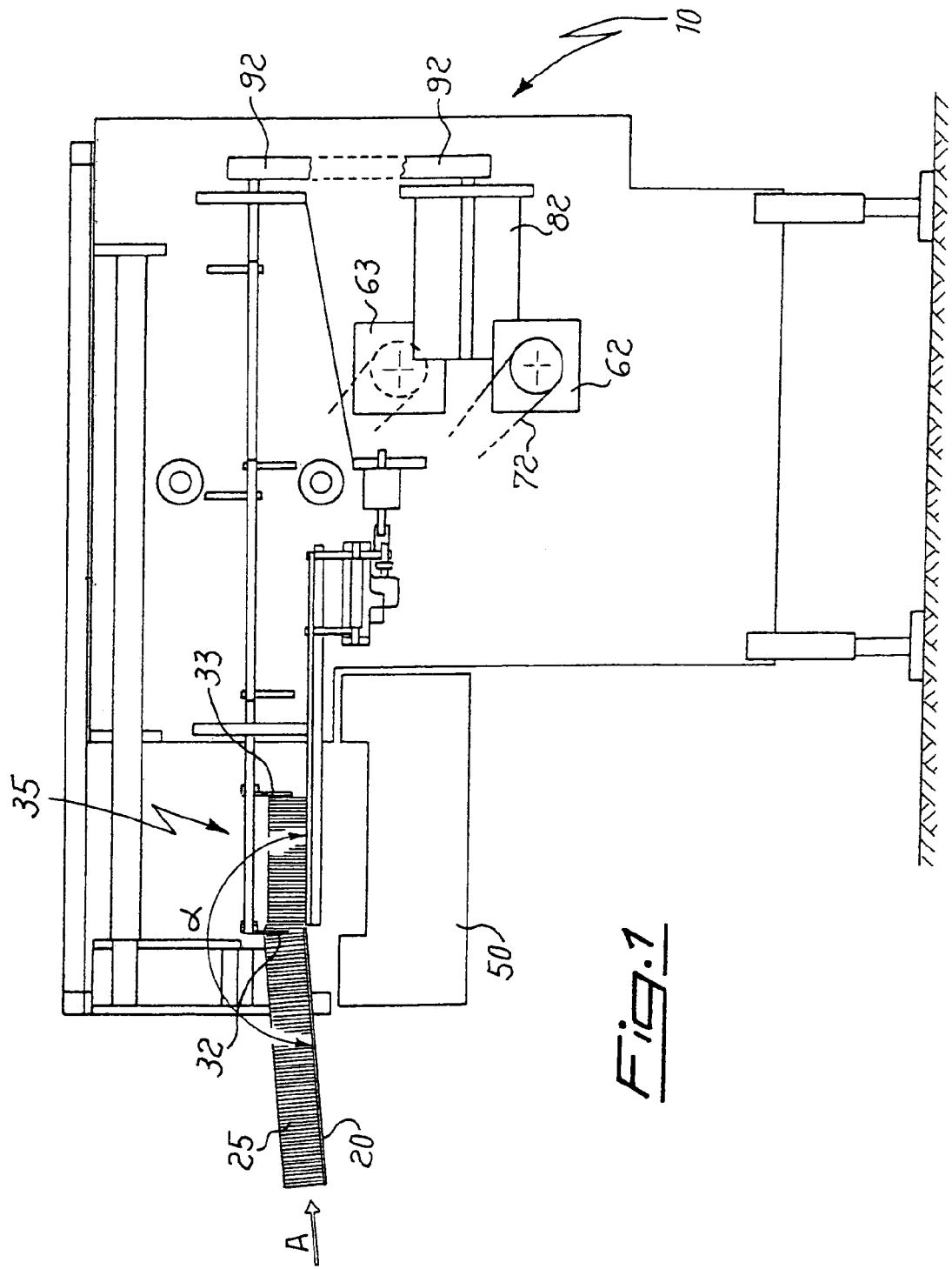
FIG. 1 is a cross-sectional side view of a machine for portioning products according to the present invention.
Figure 2:
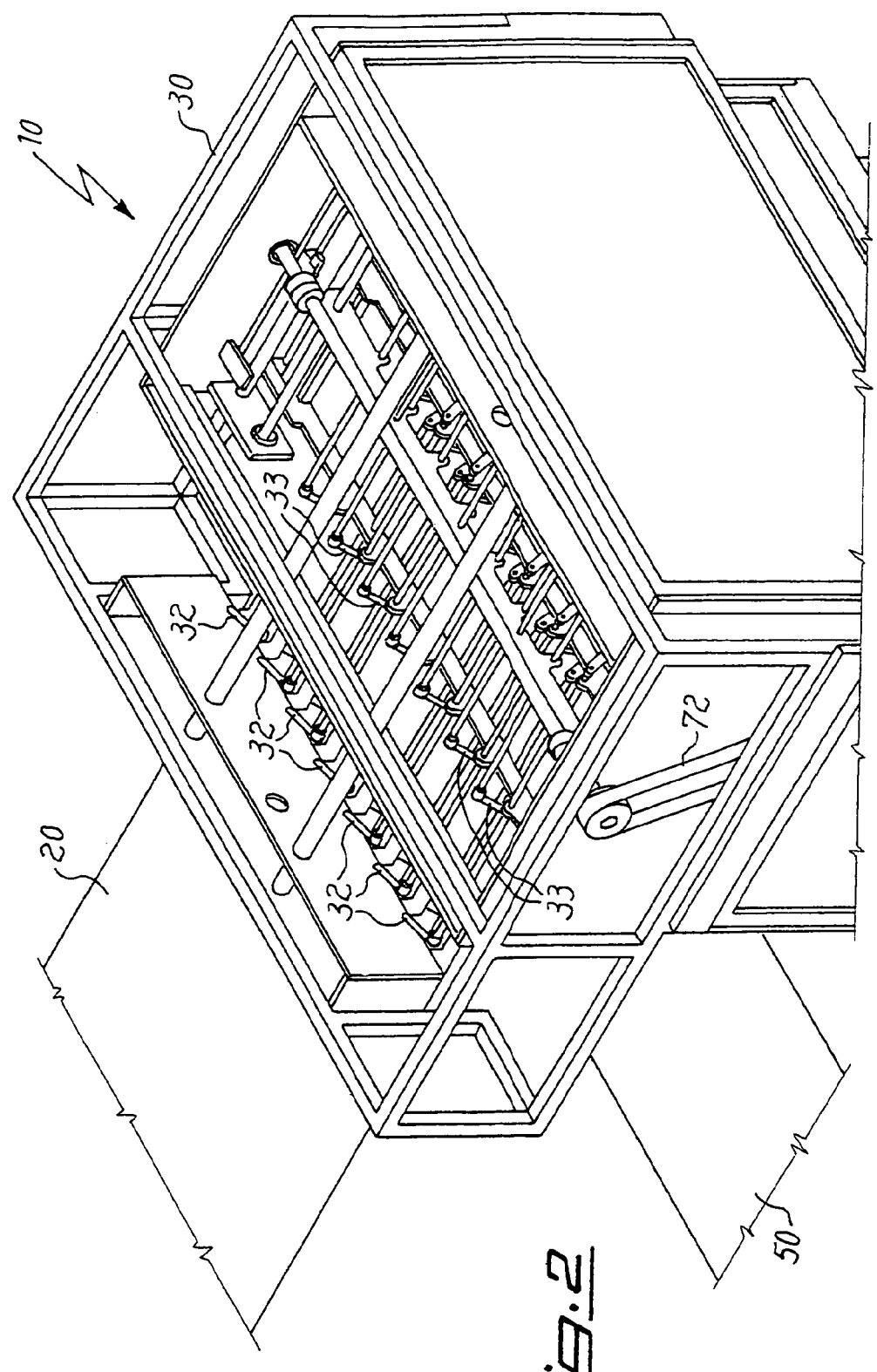
FIG. 2 is a perspective view from above of the machine of FIG. 1.

FIGS. 1 and 2 are schematic representations of a machine 10 according to the present invention for carrying out portioning of products, such as biscuits or the like, in stacks having a pre-set length.

The products are fed by means of a feed conveyor 20 to a portioning unit 30, in which one or more portioning stations 35 are provided. In the embodiment illustrated in FIG. 2, there are visible seven portioning stations 35, but it may well be understood that the number of stations in each portioning unit 30 can vary according to the particular production needs, without this implying a departure from the scope of the present invention.

As is evident from the view of FIG. 1, the products present on the feed conveyor 20 are made to advance in the direction of the arrow A. On the feed conveyor 20, the products are set facing one another in a substantially vertical position and resting with a side edge upon the conveyor itself so as to form continuous rows 25. Each row 25 is guided towards a respective portioning station 35, in which there are formed stacks of pre-set length, namely portions having substantially the same volume of products.

In each portioning station 35, there are provided at least one first supporting element 32 and at least one second supporting element 33 (FIG. 2). The first supporting elements 32 of all the portioning stations 35 are driven in translation by a first electric motor 62 (FIG. 1) which transmits motion to a gear/rack combination by means of a belt 72.

A second electric motor 63, controlled independently of the electric motor 62, in turn imparts motion of translation to the second supporting elements 33.

n the same way, the driving in rotation of the supporting elements 32 is controlled independently of the driving in rotation of the supporting elements 33 in all the portioning stations 35. Of the two distinct electric motors which control movement of rotation, only one is represented and is designated by the reference number 82 in FIG. 1. Also in this case, the movement of rotation is transmitted by a belt 92.

The steps of formation of the stacks of products in a portioning station 35 are illustrated schematically in FIGS. 3A–8A and in FIGS. 3B–8B.

Figure 3A:
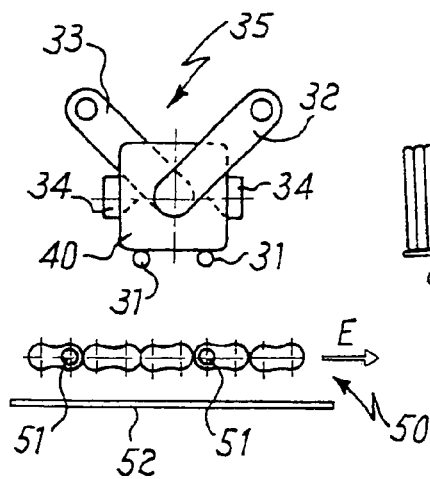
Figure 3B:
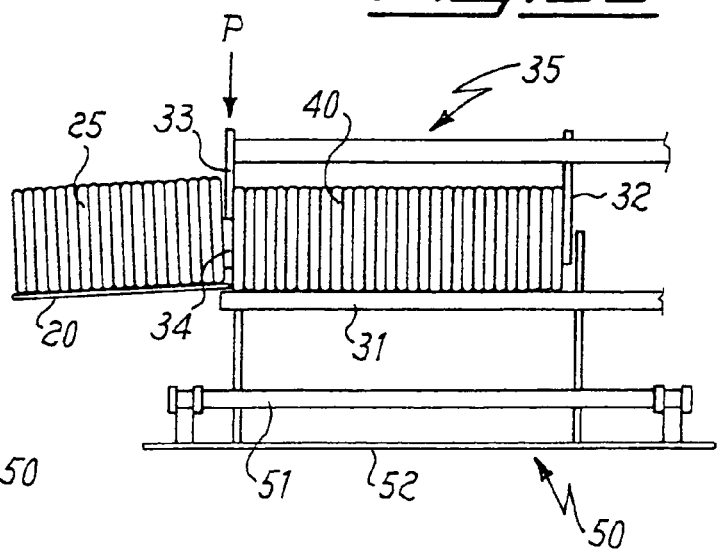

The front view of FIG. 3A and the side view of FIG. 3B illustrate a portioning station 35, in which there is already present a completed stack of products 40. The stack 40 rests on a pair of mobile bottom elements 31 and is supported laterally by the supporting elements 32 and 33. In this phase, the supporting element 32 is in a position of engagement with the product at the top of the stack 40, whilst the supporting element 33 has been carried into a position of engagement with the product at the bottom of the stack 40, i.e. it has been inserted by means of rotation of the latter between the product at the head of the row 25 and the product which is at the bottom of the stack 40.

It should be emphasised that the surface of the feed conveyor 20, on which the rows of products 25 rest, is inclined with respect to the surface formed by the mobile bottom means 31 at an angle α greater than 180° (FIG. 1). This enables "fanwise" opening of the products in a position corresponding to the passage from the feed conveyor 20 to the portioning station 35, and hence the creation of an open angled space between the products. In said space there may be conveniently inserted the supporting element 33, which acts in this case as separator element between the stack 40 and the row 25, without damaging the products.

A jet of air under pressure, represented schematically by the arrow P in FIG. 3B, may be advantageously provided in a position corresponding to the passage between the conveyor 20 and the portioning station 35 for favouring the fanwise opening of the products.

In the step represented in FIGS. 3A and 3B, the stack 40 is thus already separated from the row 25, with the latter withheld by stop elements 34 to enable the subsequent step of discharge of the stack 40 already formed. Also the stop elements 34 are inserted between the products opened fanwise, without causing damage to the products themselves, and the product which is at the head of the row 25 bears upon the stop elements 34.

The stop elements 34 in any one portioning station 35 may preferably be actuated independently of the stop elements in any one of the other portioning stations. In this case, activation of the stop elements 34 may be controlled by means of distinct pneumatic actuators or else by means of electric motors that are separate from one another and controlled independently.

A discharging conveyor 50, represented schematically also in FIGS. 1 and 2, is set underneath the portioning stations 35 and moves in a continuous way in the direction of the arrow E in FIG. 3A. The stacks of products discharged are separated, for example, by transverse rods 51 and rest on a surface 52.

Figure 4A:
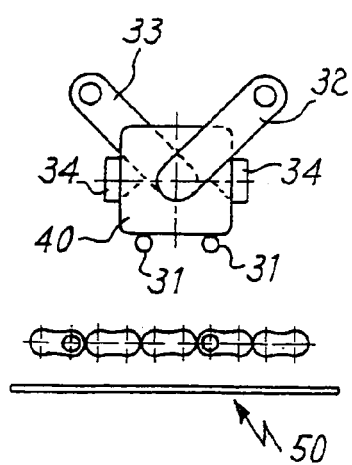
Figure 4B:
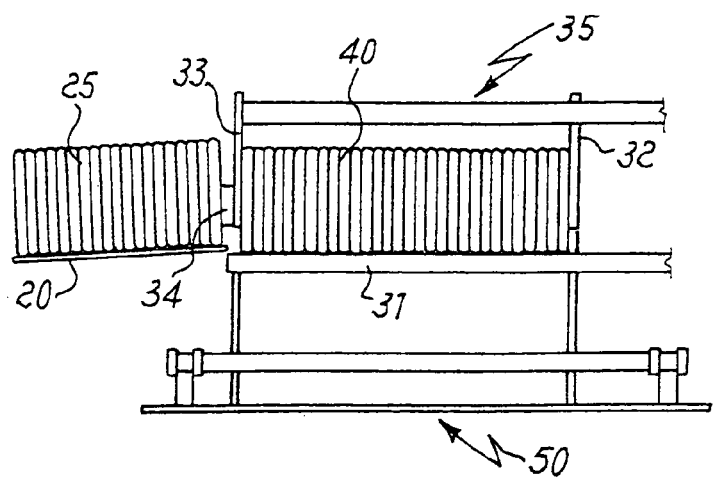

FIGS. 4A and 4B illustrate a preparatory step of discharge of the stack 40. In this step, the supporting elements 32 and 33 act in translation for carrying the stack 40 into the right position of discharge above the discharging conveyor 50. The row 25 of the products fed to the portioning station 35 is still bearing upon the stop elements 34. In this step, also the feed conveyor 20 is stopped, waiting for the stack 40 to be discharged from the portioning station.

Figure 5A:
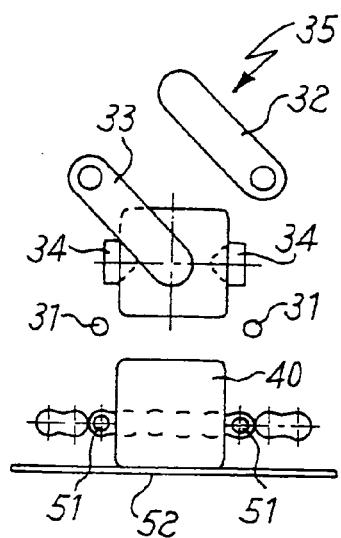
Figure 5B:
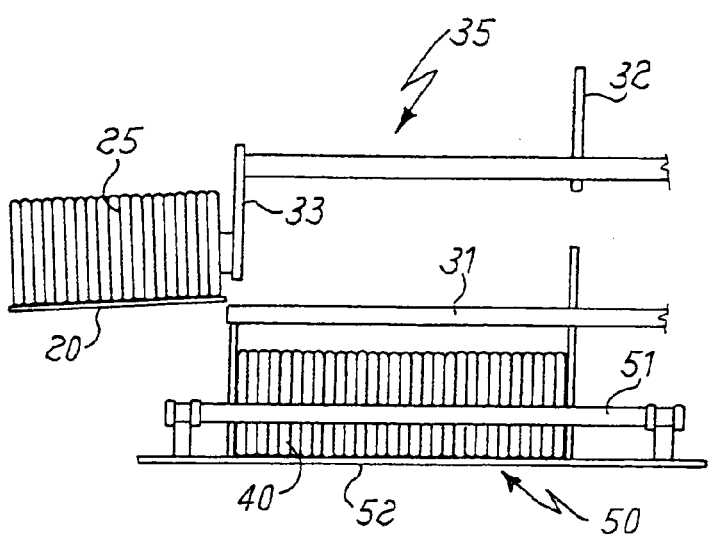

The step of discharge of the stack 40 is illustrated in FIGS. 5A and 5B. In particular, the view of FIG. 5A shows the bottom means 31 which are moved away from one another to enable release of the stack 40 onto the surface 52 between two transverse rods 51 of the discharging conveyor 50. The supporting element 32 is then rotated into a position of disengagement from the products.

The simultaneous movement of the bottom means 31 in all the portioning stations 35 may be controlled by one or more pneumatic actuators or else by one or more electric motors.

Figure 6A:
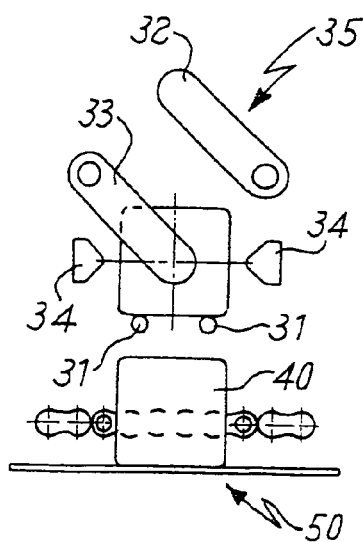
Figure 6B:
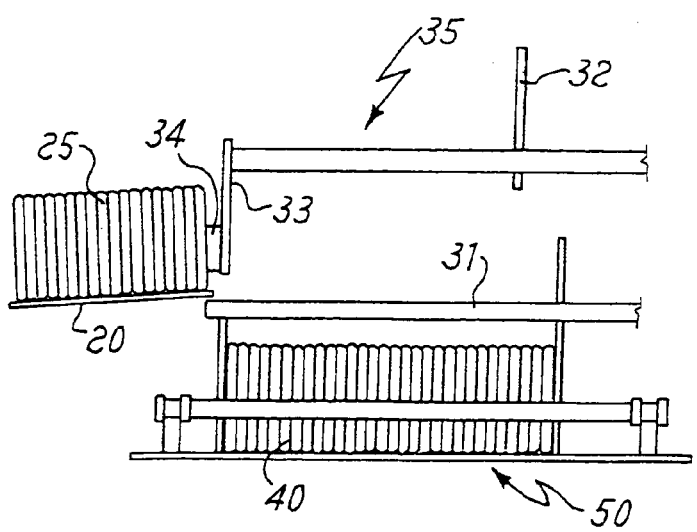

Once the stack that is formed 40 has been deposited on the conveyor 50, the formation of a new stack can start. The start of this step is illustrated in FIGS. 6A and 6B, where the bottom means 31 are brought back into the appropriate position for supporting the new stack which will be formed in the portioning station 35. Simultaneously, the stop elements 34 are removed from the position of engagement with the products, and the feed conveyor 20 will again be started up for carrying the products that are at the head of the row 25 into the portioning station 35. In this way, the first product at the head of the row 25 will come to bear upon the supporting element 33, whilst the supporting element 32 starts its return travel in translation towards the initial position, into which it will move to separate the new stack being formed.

Figure 7A:
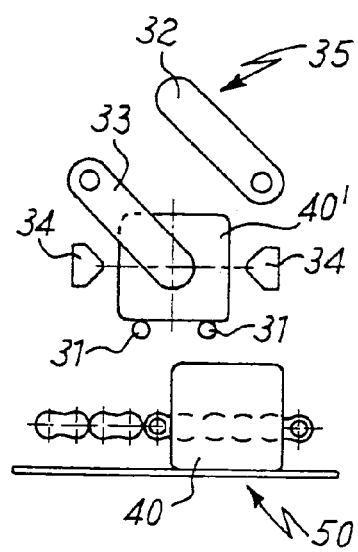
Figure 7B:
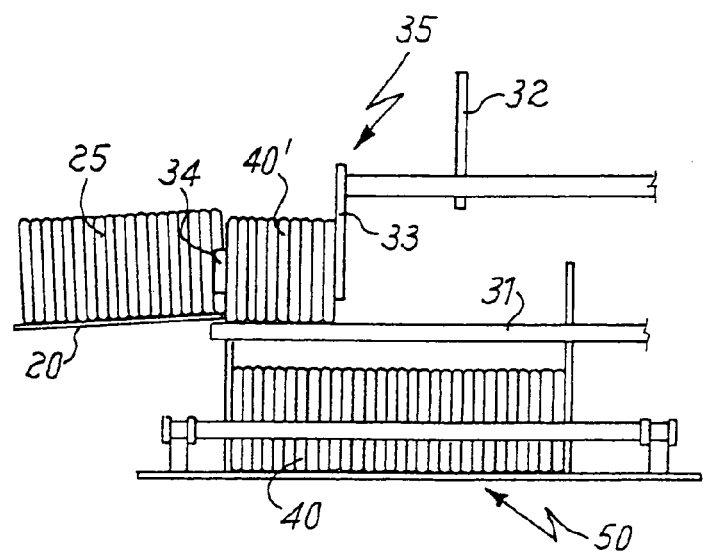

FIGS. 7A and 7B illustrate an intermediate step in the formation of a new stack 40', whilst the stack already formed 40 is carried away by the discharging conveyor 50. The supporting element 33 is translating towards the bottom of the portioning station 35 to support the products of the new stack 40', whilst the feed conveyor 20 pushes the products towards the inside of the station itself. The supporting element 32 has instead almost completed its travel in translation towards the input of the portioning station 35.

Figure 8A:
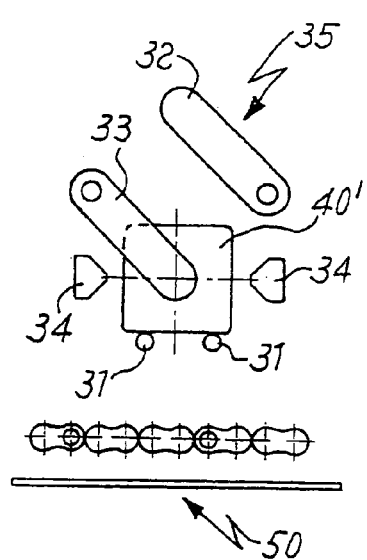
Figure 8B:
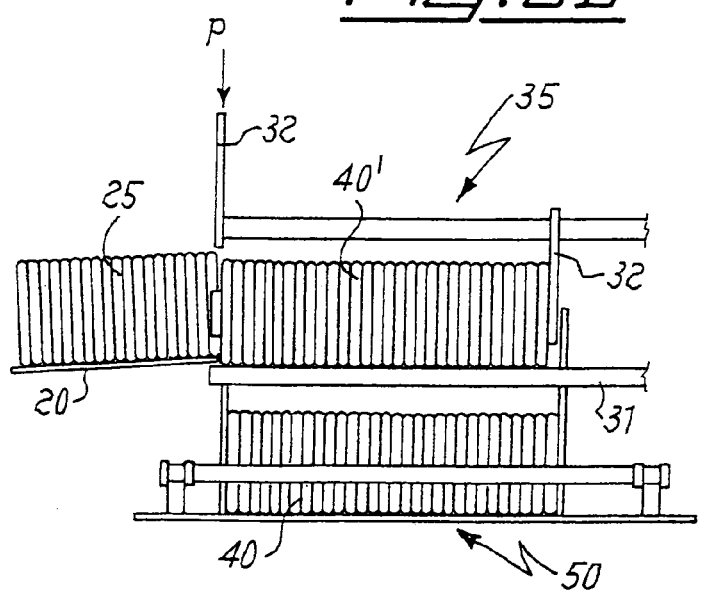

Upon completion of the new stack 40', as illustrated in FIGS. 8A and 8B, the supporting element 32 has already reached the initial position and is waiting for the separation of the new stack 40' from the row 25 to be carried out. At this point, the movement of the feed conveyor 20 will be interrupted, and the element 32 will be driven in rotation to be carried from the position of disengagement with respect to the products, namely the position illustrated in FIGS. 8A and 8B, up to the position of engagement with the products, namely the same position occupied by the other supporting element 33 in FIGS. 3A and 3B.

Also in this step a jet of air under pressure (arrow P) may be provided, which favours the fanwise opening of the products in a position corresponding to the passage from the feed conveyor 20 to the portioning station 35.

From this position onwards, the cycle resumes again as represented in FIGS. 3A and 3B, but with the supporting elements 32 and 33 which act in reversed positions. Each of the supporting elements 32 and 33 is hence utilised in each cycle as element of separation between row and stack in a mutually exclusive way.

All the movements are synchronised by programmable control means, for example microprocessors, PLCs or the like, which guarantee driving in translation and in rotation of the supporting elements 32 and 33, driving of the bottom means between the positions of support and release of the stack, and intermittent operation of the feed conveyor 20.

Other embodiments may be envisaged without departing from the scope of the present invention. For instance, the feed conveyor 20 may be constituted by a single mobile part, which draws the products in rows towards the portioning unit 30.

Alternatively, the feed conveyor 20 may be constituted by at least one mobile part, which draws the products in rows towards the portioning unit 30, and by at least one fixed part, set between the mobile part and the portioning unit 30, which forms an inclined ramp for sliding the products up to the portioning unit.

A possible embodiment of a fixed ramp 120 set between the conveyor 20 and a portioning station 35 is illustrated in FIG. 9. The ramp 120 comprises a curved surface, which presents a slightly concave initial section and a slightly convex final section. As may be noted, the products which are found at the head of the row 25 open in a particularly favourable way for enabling insertion of the supporting element 32 in the separation step. In this case, by appropriately regulating the cycle of advance and arrest of the conveyor 20, the products of the row 25 which are found on the section with convex curvature, in the absence of thrust by the conveyor 20, are brought into a condition where they are inclined backwards, so opening fanwise and favouring the subsequent insertion of a supporting element 32 (or 33). Thanks to this solution, it is also possible to avoid the use of the stop elements 34 (FIGS. 3A–8A and 3B–8B), thus reducing the moving parts of the machine.

What is claimed is:

1. A machine for portioning products in stacks of pre-set length, comprising a feed conveyor which carries said products to a portioning unit provided with one or more portioning stations, said products being set facing one another in a substantially vertical position and resting with a side edge upon said feed conveyor so as to form one or more continuous rows of products, each of said rows of products being directed to a respective one of said one or more portioning stations, characterized in that each of said portioning stations comprises at least two supporting elements arranged to support opposite ends of an elongated, mobile stack of said products in translation, parallel to the longitudinal axis of said stack, between an initial position of separation of the stack from the respective row and a final position distant from said initial position by a distance greater than or equal to the pre-set length of said stack, said feed conveyor including at least one mobile part for drawing along said products in rows towards said portioning unit, and at least one fixed part, which forms an inclined ramp set between said mobile part and said portioning unit for sliding said products into said portioning unit.

2. A machine according to claim 1, wherein each of said two supporting elements for supporting the stack are arranged to operate in a mutually exclusive manner for separating said stack from the respective row when said stack is in said initial position.

3. A machine according to claim 1, wherein said supporting elements are mobile in rotation between a position of engagement with the products set at opposite ends of said stack and a position of disengagement with the products at an end of said stack.

4. A machine according to claim 1, wherein at least one first supporting element and at least one second supporting element are provided in each portioning station, and wherein the first supporting elements of said portioning stations are driven in translation by a first electric motor controlled independently of a second electric motor which drives in translation the second supporting elements of said portioning stations.

5. A machine according to claim 1, wherein means are provided for directing a controlled flow of air under pressure towards said products in a position corresponding to the area of passage of said products from said feed conveyor to each of said portioning stations.

6. A machine according to claim 1, wherein means are provided for controlling the driving of said feed conveyor in an intermittent way.

7. A machine according to claim 1, further comprising a resting surface on which rests said stack, said feed conveyor being inclined with respect to the resting surface to define an angled space between the stack and the respective row of products from which the stack is separated and into which one of said at least two supporting elements is inserted to give rise to the initial position of separation of the stack from the respective row.

8. A machine according to claim 1, wherein stop elements are provided for arresting the row in each of said portioning stations, said stop elements being mobile between a position of engagement with the product at the end of said row and a position of disengagement with the product at the end of said row.

9. A machine according to claim 8, wherein said stop elements in any portioning station may be driven in translation in a way independent of the stop elements in any other portioning station.

10. A machine according to claim 1, wherein each of said portioning stations comprises bottom means on which there rests a side edge of the products of a stack being formed, said bottom means being mobile between a position of support of said stack being formed and a position of release of the stack of pre-set length towards a discharging conveyor for discharging the completed stack.

11. A machine according to claim 10, further comprising means for controlling, in a synchronized manner, at least driving of said supporting elements in translation and in rotation, driving of said bottom means between said positions of support and release of said stack, and driving of said feed conveyor in an intermittent manner.

12. A machine for portioning products in stacks of pre-set length, comprising a feed conveyor which carries said products to a portioning unit provided with one or more portioning station, said products being set facing one another in a substantially vertical position and resting with a side edge upon said feed conveyor so as to form one or more continuous rows of products, each of said rows of products being directed to a respective one of said one or more portioning stations, characterized in that each of said portioning stations comprises at least two supporting elements arranged to support opposite ends of an elongated, mobile stack of said products in translation, parallel to the longitudinal axis of said stack, between an initial position of separation of the stack from the respective row and a final position distant from said initial position by a distance greater than or equal to the pre-set length of said stack, said feed conveyor including at least one mobile part for drawing along said products in rows towards said portioning unit, and at least one fixed part, which forms a ramp with a curvilinear resting surface set between said mobile part and said portioning unit for sliding said products into said portioning unit.

13. A machine according to claim 1, wherein at least one first supporting element and at least one second supporting element are provided in each portioning station, and wherein the first supporting elements of said portioning stations are driven in rotation by an electric motor controlled independently of a further electric motor, which drives in rotation the second supporting elements of said portioning stations.

* * * * *